(12) United States Patent
Hwang et al.

(10) Patent No.: US 7,356,090 B2
(45) Date of Patent: *Apr. 8, 2008

(54) TRANSMISSION/RECEPTION APPARATUS FOR A WIRELESS COMMUNICATION SYSTEM WITH THREE TRANSMISSION ANTENNAS

(75) Inventors: Chan-Soo Hwang, Yongin-shi (KR); Seung-Hoon Nam, Seoul (KR); Yung-Soo Kim, Songnam-shi (KR); Jae-Hak Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 700 days.

This patent is subject to a terminal disclaimer.

(21) Appl. No.: 10/691,903

(22) Filed: Oct. 23, 2003

(65) Prior Publication Data
US 2004/0132413 A1 Jul. 8, 2004

(30) Foreign Application Priority Data
Jan. 2, 2003 (KR) ............... 10-2003-0000144

(51) Int. Cl.
*H04L 27/00* (2006.01)
*H04L 1/02* (2006.01)
*H04B 7/02* (2006.01)
*H04B 1/38* (2006.01)

(52) U.S. Cl. .................. 375/295; 375/267; 455/73
(58) Field of Classification Search ........... 375/295, 375/299, 267, 316, 347, 349, 259, 260; 370/204; 455/562.1
See application file for complete search history.

(56) References Cited

U.S. PATENT DOCUMENTS 6,317,411 B1 * 11/2001 Whinnett et al. ........... 370/204

| | | | |
|---|---|---|---|
| 6,865,237 B1 * | 3/2005 | Boariu et al. ............... | 375/295 |
| 2003/0073410 A1 * | 4/2003 | Hottinen et al. ............. | 455/69 |
| 2004/0072594 A1 * | 4/2004 | Hwang et al. ............... | 455/562.1 |
| 2004/0137864 A1 * | 7/2004 | Hwang et al. ............... | 455/130 |

(Continued)

OTHER PUBLICATIONS

Uysal et al., New Space-Time Codes for High Throughput Efficiency, Nov. 25-29, 2001, Global Telecommunications Conference, vol. 2, pp. 1103-1107.*

(Continued)

*Primary Examiner*—Mohammed Ghayour
*Assistant Examiner*—Lawrence Williams
(74) *Attorney, Agent, or Firm*—The Farrell Law Firm, PC

(57) ABSTRACT

An apparatus uses transmission antenna diversity to compensate for fading. An encoder according to a first embodiment forms 4 combinations each including 3 symbols so that 4 input symbols should be transmitted only once at each antenna and each time interval, and delivers the combinations to the 3 transmission antennas for 4 time intervals, and two or more symbols selected from the 4 input symbols are phase-rotated by predetermined phase values before being transmitted via the transmission antennas. An encoder according to a second embodiment forms 3 combinations each including 3 symbols so that 3 input symbols should be transmitted only once at each antenna and each time interval, and delivers the combinations to the 3 transmission antennas for 3 time intervals, and two or more symbols selected from the 3 input symbols are phase-rotated by predetermined phase values before being transmitted via the transmission antennas. In this way, the apparatus secures a maximum diversity order and copes with fast fading by reducing transmission latency.

18 Claims, 11 Drawing Sheets

U.S. PATENT DOCUMENTS

2004/0137951 A1* 7/2004 Hwang et al. ........... 455/562.1
2004/0213353 A1* 10/2004 Hwang et al. .............. 375/267

OTHER PUBLICATIONS

European Search Report dated Mar. 3, 2004 issued in a counterpart application, namely, Appln. No. EP 03 07 8910.

Murat Uysal et al., "New Space-Time Block Codes for High Throughput Efficiency", 2001 IEEE, pp. 1103-1107.

Olav Tirkkonen et al., "Improved MIMO Performance with Non-Orthogonal Space-Time Block Codes", 2001 IEEE, pp. 1122-1126.

Lei Shao et al., "A Rate-One Non-Orthogonal Space-Time Coded OFDM System with Estimation for Frequency Selective Channels", 2002 IEEE, pp. 676-680.

V. Tarokh, H. Jafarkhani, and A. R. Calderbank, "Space-Time Block Codes from Orthogonal Designs", IEEE Trans. Inform. Theory, vol. 45, pp. 1456-1467, Jul. 1999.

Siavash M. Alamouti "A Simple Transmitter Diversity Scheme For Wireless Communications," IEEE Journal on Selected Area in Communications, vol. 16, pp. 1451-1458, Oct. 1998.

Naresh Sharma et al., Improved Quasi-Orthogonal Codes Through Constellation Rotation, 2002.

Weifeng Su et al., A Design of Quasi-Orthogonal Space-Time Block Codes with Full Diversity, 2002.

Yan Xin et al., Space-Time Diversity Systems Based on Unitary Constellation-Rotating Precoders, 2001.

* cited by examiner

TRANSMISSION/RECEPTION APPARATUS FOR A WIRELESS COMMUNICATION SYSTEM WITH THREE TRANSMISSION ANTENNAS

PRIORITY

This application claims priority under 35 U.S.C. § 119 to an application entitled "Transmission/Reception Apparatus for a Wireless Communication System with Three Transmission Antennas" filed in the Korean Intellectual Property Office on Jan. 2, 2003 and assigned Serial No. 2003-144, the contents of which are incorporated herein by reference.

BACKGROUND OF THE INVENTION

1. Field of the Invention

The present invention relates generally to a wireless communication system, and in particular, to a transmission/reception apparatus using transmission antenna diversity to compensate for degradation due to fading.

2. Description of the Related Art

In a wireless communication system, time and frequency diversity is one effective techniques for suppressing fading. Among known techniques for antenna diversity, a space-time block code proposed by Vahid Tarokh extends transmission antenna diversity proposed by S. M. Alamouti so that two or more antennas can be used. The proposal made by Tarokh is disclosed in a paper "Space Time Block Coding From Orthogonal Design," IEEE Trans. on Info., Theory, Vol. 45, pp. 1456-1467, July 1999, and the proposal made by Alamouti is disclosed in a paper "A Simple Transmitter Diversity Scheme For Wireless Communications," IEEE Journal on Selected Area in Communications, Vol. 16, pp. 1451-1458, October 1998.

FIG. 1 is a block diagram illustrating a structure of a transmitter using a space-time block code according to the prior art. The transmitter is proposed by Tarokh, and as illustrated, is comprised of a serial-to-parallel (S/P) converter 110 and an encoder 120. In this structure, the transmitter uses three antennas 130, 132 and 134.

Referring to FIG. 1, the S/P converter 110 groups 4 input symbols into one block, and provides the block to the encoder 120. The encoder 120 makes 8 combinations with the 4 symbols, and delivers the 8 combinations to the 3 transmission antennas 130, 132 and 134 for 8 time intervals. The 8 combinations can be expressed in an 8×3 encoding matrix which is defined as $$g_3 = \begin{bmatrix} s_1 & s_2 & s_3 \\ -s_4 & s_1 & -s_4 \\ -s_3 & s_4 & s_1 \\ -s_4 & -s_3 & s_2 \\ s_1^* & s_2^* & s_3^* \\ -s_2^* & s_1^* & -s_4^* \\ -s_3^* & s_4^* & s_1^* \\ s_4^* & s_3^* & s_2^* \end{bmatrix} \quad (1)$$

where $g_3$ represents an encoding matrix of symbols transmitted via 3 transmission antennas, and $s_1$, $s_2$, $s_3$ and $s_4$ represent 4 input symbols to be transmitted.

The encoder 120 applies negative and conjugate to 4 input symbols, and outputs the result values to the 3 antennas 130, 132 and 134 for 8 time intervals. In this case, symbol sequences output to the antennas, i.e., rows, are orthogonal with one another.

More specifically, in a first time interval, 3 symbols $s_1$, $s_2$, and $s_3$ in a first row are delivered to the 3 antennas 130, 132 and 134, respectively. Likewise, in the last time interval, 3 symbols $s_4^*$, $s_3^*$ and $s_2^*$ in the last row are delivered to the 3 antennas 130, 132 and 134, respectively. That is, the encoder 120 sequentially delivers symbols in an $M^{th}$ row of the encoding matrix to an $M^{th}$ antenna.

FIG. 2 is a block diagram illustrating a structure of a receiver for receiving a signal transmitted from the transmitter of FIG. 1. As illustrated, the receiver is comprised of a plurality of reception antennas 140 and 142, a channel estimator 150, a multi-channel symbol arranger 160, and a detector 170.

Referring to FIG. 2, the channel estimator 150 estimates channel coefficients representing a channel gain from transmission antennas to reception antennas, and the multi-channel symbol arranger 160 collects reception symbols from the reception antennas 140 and 142, and provides the collected reception symbols to the detector 170. The detector 170 then calculates a decision statistic for all possible symbols with hypotheses symbols determined by multiplying the reception symbols by the channel coefficients, and detects transmission symbols by threshold detection.

The space-time block coding technique proposed by Alamouti, though complex symbols are transmitted through 2 transmission antennas, obtains a diversity order equivalent to the number of transmission antennas, i.e., the maximum diversity order, without inflicting a loss on a rate. The devices of FIGS. 1 and 2 proposed by Tarokh by extending this technique obtain a maximum diversity order using a space-time block code in the form of a matrix having orthogonal rows. However, since the devices transmit 4 complex symbols for 8 time intervals, they suffer a loss of the rate by ½. In addition, since 8 time intervals are required in completely transmitting one block (having 4 symbols), reception performance become poor due to a variation in a channel environment within a block in the case of fast fading.

When complex symbols are transmitted using 3 or more antennas as mentioned above, 2N time intervals are required in order to transmit N symbols, resulting in a loss of a rate. The loss of a rate also causes an increase in latency.

SUMMARY OF THE INVENTION

It is, therefore, an object of the present invention to provide a transmission/reception apparatus for securing a maximum diversity order and a maximum rate without a loss of a rate in a wireless communication system using 3 transmission antennas.

According to a first aspect of the present invention, there is provided a transmitter for transmitting complex symbols in a wireless communication system. The transmitter comprises three transmission antennas; and an encoder for grouping 4 input symbols into 4 combinations each including three symbols so that the 4 input symbols are transmitted only once at each antenna and each time interval, and delivering the 4 combinations to the three transmission antennas for 4 time intervals; wherein two or more symbols selected from the 4 input symbols are phase-rotated by predetermined phase values, respectively.

According to a second aspect of the present invention, there is provided a receiver for receiving complex symbols in a wireless communication system. The receiver comprises a symbol arranger for receiving signals received via at least one reception antenna from thee transmission antennas, for four time intervals; a channel estimator for estimating three channel gains representing channel gains from the three transmission antennas to the reception antenna; first and second decoders for calculating metric values for all possible sub-combinations each including two symbols by using the channel gains and the signals received by the symbol arranger, and detecting two symbols having a minimum metric value; and a parallel-to-serial converter for sequentially arranging two symbols detected by the first and second decoders.

According to a third aspect of the present invention, there is provided a transmitter for transmitting complex symbols in a wireless communication system. The transmitter comprises three transmission antennas; and an encoder for grouping 3 input symbols into 3 combinations each including three symbols so that the 3 input symbols are transmitted only once at each antenna and each time interval, and delivering the 3 combinations to the three transmission antennas for 3 time intervals; wherein two or more symbols selected from the 3 input symbols are phase-rotated by predetermined phase values, respectively.

According to a fourth aspect of the present invention, there is provided a receiver for receiving complex symbols in a wireless communication system. The receiver comprises a symbol arranger for receiving signals received via at least one reception antenna from three transmission antennas, for three time intervals; a channel estimator for estimating three channel gains representing channel gains from the three transmission antennas to the reception antenna; and a decoder for calculating metric values for all possible symbol combinations each including three symbols by using the channel gains and the signals received by the symbol arranger, and detecting three symbols having a minimum metric value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
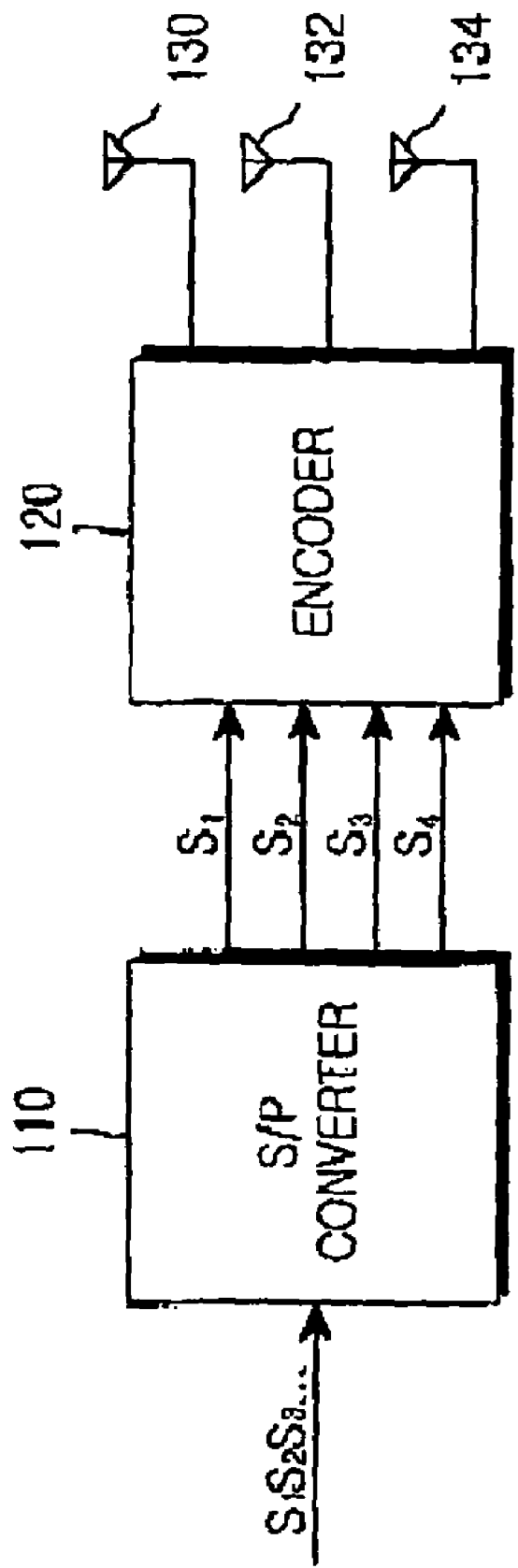
FIG. 1 is a block diagram illustrating a structure of a transmitter using a space-time block code according to the prior art.
Figure 2:
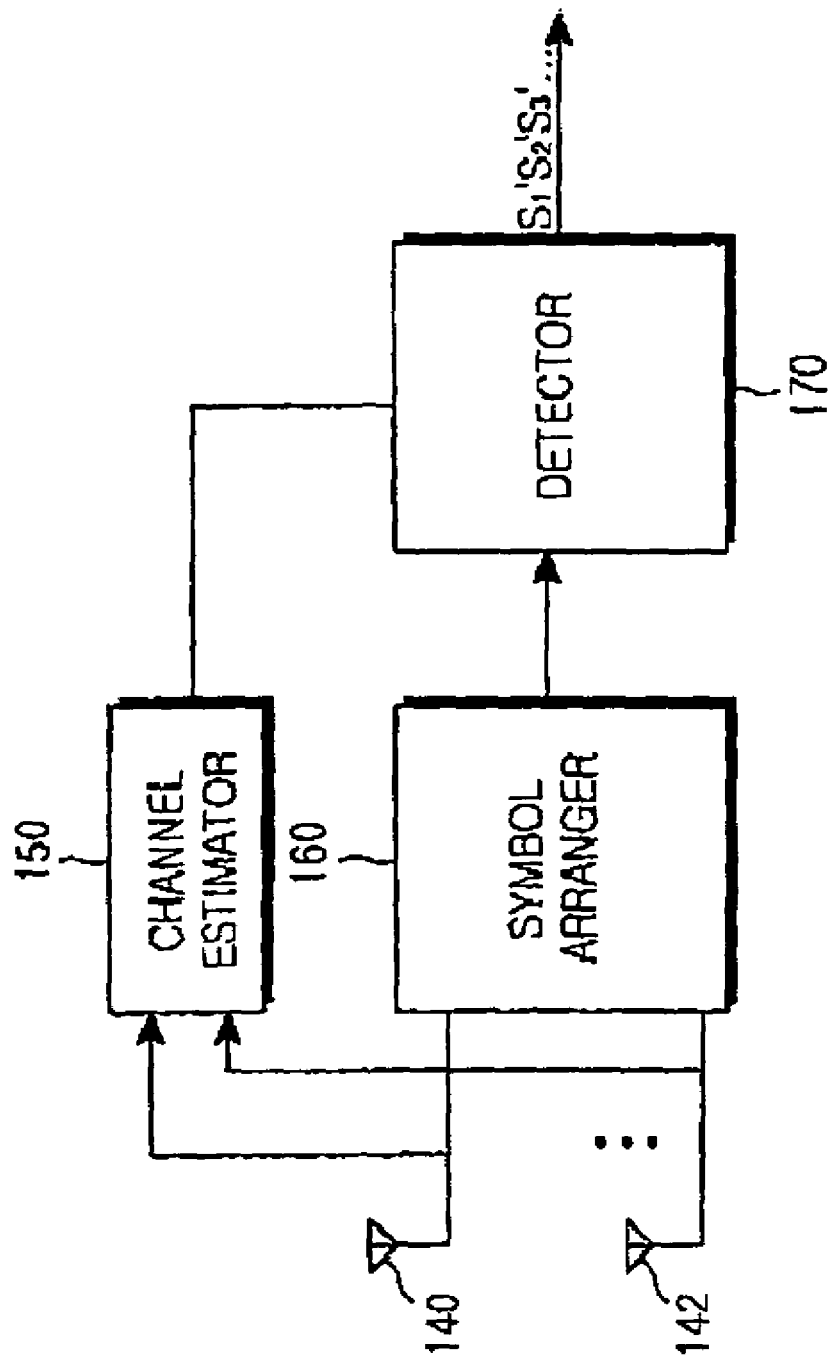
FIG. 2 is a block diagram illustrating a structure of a receiver for receiving a signal transmitted from the transmitter of FIG. 1.

Several preferred embodiments of the present invention will now be described in detail with reference to the annexed drawings. In the following description, a detailed description of known functions and configurations incorporated herein has been omitted for conciseness. In addition, the terms used in the following description are defined considering their functions in the invention. Therefore, a definition of the terms must be given based on the overall contents of the specification.

The invention phase-rotates a part of a complex transmission signal to secure a maximum diversity order and a maximum rate, and introduces a partial orthogonal structure to simplify a decoding scheme. In particular, the invention proposes two embodiments for an optimal block code which is available when 3 transmission antennas are used. A first embodiment is to optimize a diversity order and a rate, and the second embodiment is to minimize transmission latency. The two embodiments will be separately described below. Although a structure and operation of phase-rotating two transmission symbols will be described below, two or more transmission symbols can be phase-rotated to accomplish the invention.

First Embodiment

In the first embodiment of the invention, 4 input symbols are transmitted via 3 antennas for 4 time intervals, and this can be expressed in an encoding matrix defined as $$c_{43} = \begin{bmatrix} s_1 & s_2 & s_3 \\ s_4 & s_5 & s_6 \\ s_7 & s_8 & s_9 \\ s_{10} & s_{11} & s_{12} \end{bmatrix} \quad (2)$$

As is well known, a receiver using ML (Maximum Likelihood) decoding employs a scheme for calculating a metric value with a reception signal for all possible symbols based on a channel gain from a transmission antenna to a reception antenna, and detecting a symbol that minimizes the calculated metric value.

In a receiver receiving the symbols of Equation (2), if a channel gain from an $i^{th}$ transmission antenna to one reception antenna is defined as $h_i$, a metric value corresponding to a particular symbol combination $c_t$ is expressed as $$\sum_{t=1}^{4} \left| r_t - \sum_{i=1}^{3} h_i c_t \right|^2 \quad (3)$$

where $r_t$ represents a signal received in a $t^{th}$ time interval, and $c_t$ represents a particular symbol combination created in a $t^{th}$ time interval. When the encoding matrix of Equation (2) is applied to Equation (3), the receiver determines a symbol combination that minimizes Equation (4) below, for all possible symbol combinations.

$$|r_1-h_1s_1-h_2s_2-h_3s_3|^2+|r_2-h_1s_4-h_2s_5-h_3s_6|^2+|r_3-h_1s_7-h_2s_8-h_3s_9|^2+|r_4-h_1s_{10}-h_2s_{11}-h_3s_{12}|^2 \quad (4)$$

where $r_1$, $r_2$, $r_3$ and $r_4$ are signals received at the receiver for 4 time intervals, respectively, and $h_1$, $h_2$ and $h_3$ are channel gains representing channel coefficients from 3 transmission antennas to a reception antenna.

In order to simplify an ML detection scheme of a receiver, as many crossover terms as possible must be removed from Equation (4) so that symbol sequences, i.e., rows, transmitted via transmission antennas are orthogonal with one another. For that purpose, only crossover terms are enumerated below.

$$h_1h_2{}^*C_1+h_2h_3{}^*C_2+h_1h_3{}^*C_3=h_1h_2{}^*(s_1s_2{}^*+s_4s_5{}^*+s_7s_8{}^*+s_{10}s_{11}{}^*)+h_2h_3{}^*(s_2s_3{}^*+s_5s_6{}^*+s_8s_9{}^*+s_{11}s_{12}{}^*)+h_1h_3{}^*(s_1s_3{}^*+s_4s_6{}^*+s_7s_9{}^*+s_{10}s_{12}{}^*) \quad (5)$$

It is well known by Tarokh that when 4 symbols are transmitted using a 4×3 encoding matrix, all crossover terms appearing during ML detection can be removed. However, it is possible to allow at least first and third antennas hi and $h_3$ to have orthogonality by removing at least 2 terms, i.e., $C_1$ and $C_2$, from Equation (5).

In order to secure a maximum diversity order, 4 transmission symbols must appear only once at each antenna and each time interval, and shown in Equation (6) are 4 examples of 4×3 encoding matrixes satisfying such a condition. Other encoding matrixes can be formed by mutually permuting rows or columns of the 4 matrixes.

$$\begin{bmatrix} s_1 & s_2 & s_3 \\ s_2 & s_1 & s_4 \\ s_3 & s_4 & s_1 \\ s_4 & s_3 & s_2 \end{bmatrix} \begin{bmatrix} s_1 & s_2 & s_3 \\ s_2 & s_1 & s_4 \\ s_3 & s_4 & s_2 \\ s_4 & s_3 & s_1 \end{bmatrix} \begin{bmatrix} s_1 & s_2 & s_3 \\ s_2 & s_3 & s_4 \\ s_3 & s_4 & s_1 \\ s_4 & s_1 & s_2 \end{bmatrix} \begin{bmatrix} s_1 & s_2 & s_3 \\ s_2 & s_4 & s_1 \\ s_3 & s_1 & s_4 \\ s_4 & s_3 & s_2 \end{bmatrix} \quad (6)$$

Shown in Equation (7) below is an example of an encoding matrix to which negative and conjugate are applied in order to eliminate 2 crossover terms, i.e., $C_1$ and $C_2$, of Equation (5) for the encoding matrixes of Equation (6).

$$\begin{pmatrix} s_1 & s_2 & s_4 \\ -s_2^* & s_1^* & s_3^* \\ -s_4^* & -s_3^* & s_1^* \\ s_3 & -s_4 & s_2 \end{pmatrix} \quad (7)$$

Shown in Equation (8) below are possible examples of an encoding matrix in which rows are partially orthogonal while securing a maximum diversity order.

$$\begin{bmatrix} x_1 & x_2 & -x_3^* \\ -x_2^* & x_1^* & x_4 \\ x_3 & x_4 & x_1^* \\ -x_4^* & x_3^* & -x_2 \end{bmatrix} \begin{bmatrix} x_1 & x_2 & -x_3^* \\ -x_2^* & x_1^* & -x_4 \\ x_3 & x_4 & x_1^* \\ -x_4^* & x_3^* & x_2 \end{bmatrix} \begin{bmatrix} x_1 & x_2 & x_3^* \\ -x_2^* & x_1^* & x_4 \\ x_3 & x_4 & -x_1^* \\ -x_4^* & x_3^* & -x_2 \end{bmatrix} \begin{bmatrix} x_1 & x_2 & x_3^* \\ -x_2^* & x_1^* & -x_4 \\ x_3 & x_4 & -x_1^* \\ -x_4^* & x_3^* & x_2 \end{bmatrix}$$

$$\begin{bmatrix} x_1 & x_2 & -x_3^* \\ -x_2^* & x_1^* & x_4 \\ x_3 & x_4 & x_1^* \\ x_4^* & -x_3^* & x_2 \end{bmatrix} \begin{bmatrix} x_1 & x_2 & x_3^* \\ -x_2^* & x_1^* & x_4 \\ x_3 & x_4 & -x_1^* \\ x_4^* & -x_3^* & x_2 \end{bmatrix} \begin{bmatrix} x_1 & x_2 & -x_3^* \\ x_2^* & -x_1^* & x_4 \\ x_3 & x_4 & x_1^* \\ -x_4^* & x_3^* & x_2 \end{bmatrix} \begin{bmatrix} x_1 & x_2 & x_3^* \\ x_2^* & -x_1^* & x_4 \\ x_3 & x_4 & -x_1^* \\ -x_4^* & x_3^* & x_2 \end{bmatrix}$$

$$\begin{bmatrix} x_1 & x_2 & -x_3^* \\ x_2^* & -x_1^* & -x_4 \\ x_3 & x_4 & x_1^* \\ x_4^* & -x_3^* & x_2 \end{bmatrix} \begin{bmatrix} x_1 & x_2 & -x_3^* \\ x_2^* & -x_1^* & x_4 \\ x_3 & x_4 & x_1^* \\ x_4^* & -x_3^* & -x_2 \end{bmatrix} \begin{bmatrix} x_1 & x_2 & x_3^* \\ x_2^* & -x_1^* & -x_4 \\ x_3 & x_4 & -x_1^* \\ x_4^* & -x_3^* & x_2 \end{bmatrix} \begin{bmatrix} x_1 & x_2 & x_3^* \\ x_2^* & -x_1^* & x_4 \\ x_3 & x_4 & -x_1^* \\ x_4^* & -x_3^* & -x_2 \end{bmatrix} \quad (8)$$

where $x_1$, $x_2$, $x_3$ and $x_4$ are arbitrarily arranged after negative and conjugate are applied to $s_1$, $s_2$, $s_3$ and $s_4$. Specifically, Equation (7) shows a second matrix of Equation (8) in which $x_1=s_1$, $x_2=s_2$, $x_3=-s_4{}^*$, $x_4=-s_3{}^*$.

When at least 2 crossover terms $C_1$ and $C_2$ are removed using the encoding matrixes of Equation (8), an ML detection scheme of a receiver can be simplified even further. For example, if Equation (4) is expressed again by applying the encoding matrix of Equation (7), minimizing Equation (4) is identical to minimizing Equation (9) and Equation (10) below. This is possible because a metric of Equation (9) and a metric of Equation (10) are independent of each other.

$$\mathrm{Min}(x_2, x_4)(|R_2-x_2|^2+|R_4-x_4|^2+2(C_2+C_4)\mathrm{Re}\{x_2{}^*x_4\}) \quad (9)$$

$$\mathrm{Min}(x_1, x_3)(|R_1-x_1|^2+|R_3-x_3|^2 2(C_1+C_3)\mathrm{Re}\{x_1{}^*x_3\}) \quad (10)$$

where "Min(a,b)(y(a,b))" means determining "a,b" that minimizes "y(a,b)," and "Re{ }" means calculating a real component for a complex number in braces. In addition, $C_1$ and $C_2$ become 0 as mentioned above, and $C_3=h_3{}^*h_2-h_3h_2{}^*$ and $C_4=h_3h_2{}^*-h_3{}^*h_2=-C_3$. Moreover, $R_1=r_1h_1{}^*+r_2{}^*h_2+r_3{}^*h_3$, $R_2=r_1h_2{}^*-r_2{}^*h_1+r_4h_3{}^*$, $R_3=r_2{}^*h_3+r_4h_1{}^*-r_3{}^*h_2$, and $R_4=r_1h_3{}^*-r_3{}^*h_1-r_4h_2{}^*$.

Using Equation (9) and Equation (10), a receiver decouples a part for decoding a pair of $s_1$ and $s_3$ according to Equation (9) from a part for decoding a pair of $s_2$ and $s_4$ according to Equation (10), thereby further simplifying its structure.

Meanwhile, when input symbols were generated by BPSK (Binary Phase Shift Keying), the above-stated encoding matrix always has a diversity order of 3. However, when a symbol mapping scheme of a $3^{rd}$ or higher order using a complex constellation, i.e., QPSK (Quadrature Phase Shift Keying), 8 PSK (8-ary Phase Shift Keying) and 16 PSK (16-ary PSK), is used, transmission symbols become complex symbols, so a diversity order is reduced to 2. Therefore, the invention secures a maximum diversity order 3 by phase-rotating each of 2 symbols that determine different metric values, among 4 symbols, by a predetermined phase value. Then, symbols finally transmitted via 3 antennas are expressed as $$\begin{pmatrix} e^{j\theta_1}s_1 & s_2 & e^{j\theta_4}s_4 \\ -s_2^* & e^{-j\theta_1}s_1^* & s_3^* \\ -e^{-j\theta_4}s_4^* & -s_3^* & e^{-j\theta_1}s_1^* \\ s_3 & -e^{j\theta_4}s_4 & s_2 \end{pmatrix} \quad (11)$$

Equation (11) shows an encoding matrix for phase-rotating $s_1$ and $s_4$ among input symbols $s_1$, $s_2$, $s_3$ and $s_4$ of Equation (7) by $\theta_1$ and $\theta_2$, respectively. In another case, it is possible to rotate a symbol pair of $(s_1,s_2)$, $(s_3,s_4)$ or $(s_2,s_3)$ related to different matrixes. Although phase values by which the 2 symbols are rotated respectively are different from or identical to each other, a diversity order is always maintained at 3. Likewise, if 2 symbols that determine different metric values are phase-rotated by a predetermined phase value even for the other encoding matrixes of Equation (8), final encoding matrixes can be obtained.

A transmitter and a receiver using the encoding matrixes described above are illustrated in FIGS. 3 and 4, respectively.

Figure 3:
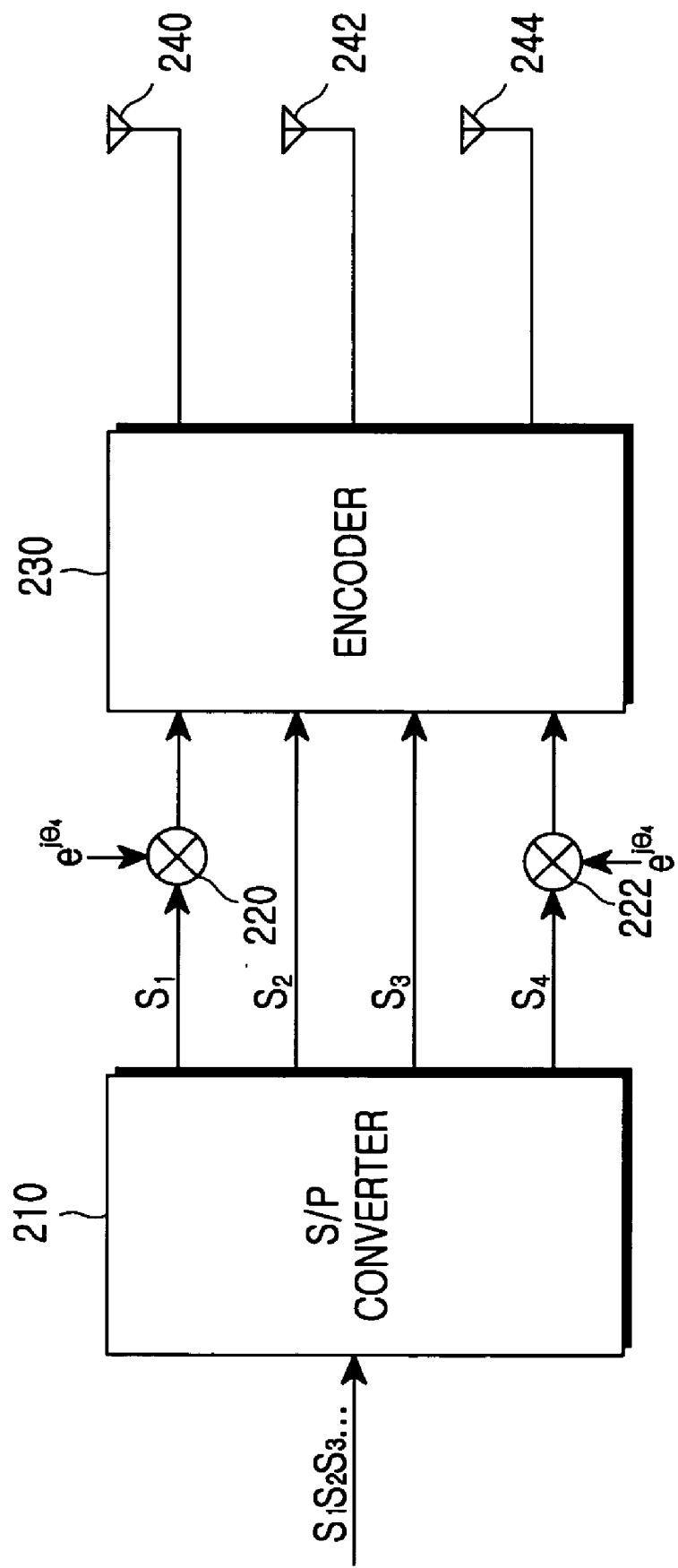
FIG. 3 is a block diagram illustrating a structure of a transmitter using a space-time block code according to a first embodiment of the present invention.

FIG. 3 is a block diagram illustrating a structure of a transmitter using a space-time block code according to a first embodiment of the present invention. As illustrated, the transmitter is comprised of a serial-to-parallel (S/P) converter 210, phase rotators 220 and 222, an encoder 230, and three transmission antennas 240, 242 and 244.

Referring to FIG. 3, the S/P converter 210 groups 4 input symbols $s_1$, $s_2$, $s_3$ and $s_4$ into one block, and provides the block to the encoder 230. Two symbols $s_1$ and $s_4$ selected from the block are rotated by predetermined phase values $\theta_1$ and $\theta_2$, respectively, by the phase rotators 220 and 222 before being provided to the encoder 230. The 2 symbols are selected so that they are related to different metrics at a receiver. The encoder 230 makes 4 combinations each including 3 symbols, with symbols of one block including the 2 phase-rotated symbols, and delivers the 4 combinations to the 3 transmission antennas 240, 242 and 244 for 4 time intervals.

In order to obtain a maximum diversity order, the encoder 230 makes the combinations so that the 4 input complex symbols should be transmitted only once at each antenna and each time interval. In addition, the encoder 230 makes the combinations by applying negative and conjugate to the input symbols so that symbol sequences delivered to each antenna should be orthogonal with one another. The reason for phase-rotating 2 symbols selected from the input symbols is to obtain a maximum diversity order even when the input symbols are complex symbols.

If the 4 combinations transmitted via the 3 antennas are expressed in a 4×3 matrix, symbols in an $M^{th}$ row of an encoding matrix are sequentially delivered to an $M^{th}$ antenna. That is, in an $n^{th}$ time interval, symbols in an $n^{th}$ column are simultaneously delivered to the 3 antennas.

For example, when $s_1$ and $s_4$ among 4 input symbols $s_1$, $s_2$, $s_3$ and $s_4$ are phase-rotated by $\theta_1$ and $\theta_2$, respectively, an output of the encoder 230 can be expressed in a 4×3 encoding matrix of Equation (11) above. When the encoding matrix of Equation (11) is used, 3 symbols $e^{j\theta_1}s_1$, $s_2$ and $e^{j\theta_4}s_4$ in a first row are delivered to the 3 antennas 240, 242 and 244, respectively, in a first time interval and symbols $s_3$, $e^{j\theta_4}s_4$ and $s_2$ in the last $4^{th}$ row are delivered to the 3 antennas 240, 242 and 244, respectively, in the last $4^{th}$ time interval.

A transmitter for transmitting the matrix of Equation (11) has been described so far. However, in a modified embodiment of the present invention, a transmitter may multiply the matrix of Equation (11) by a unitary matrix before transmission.

Figure 4:
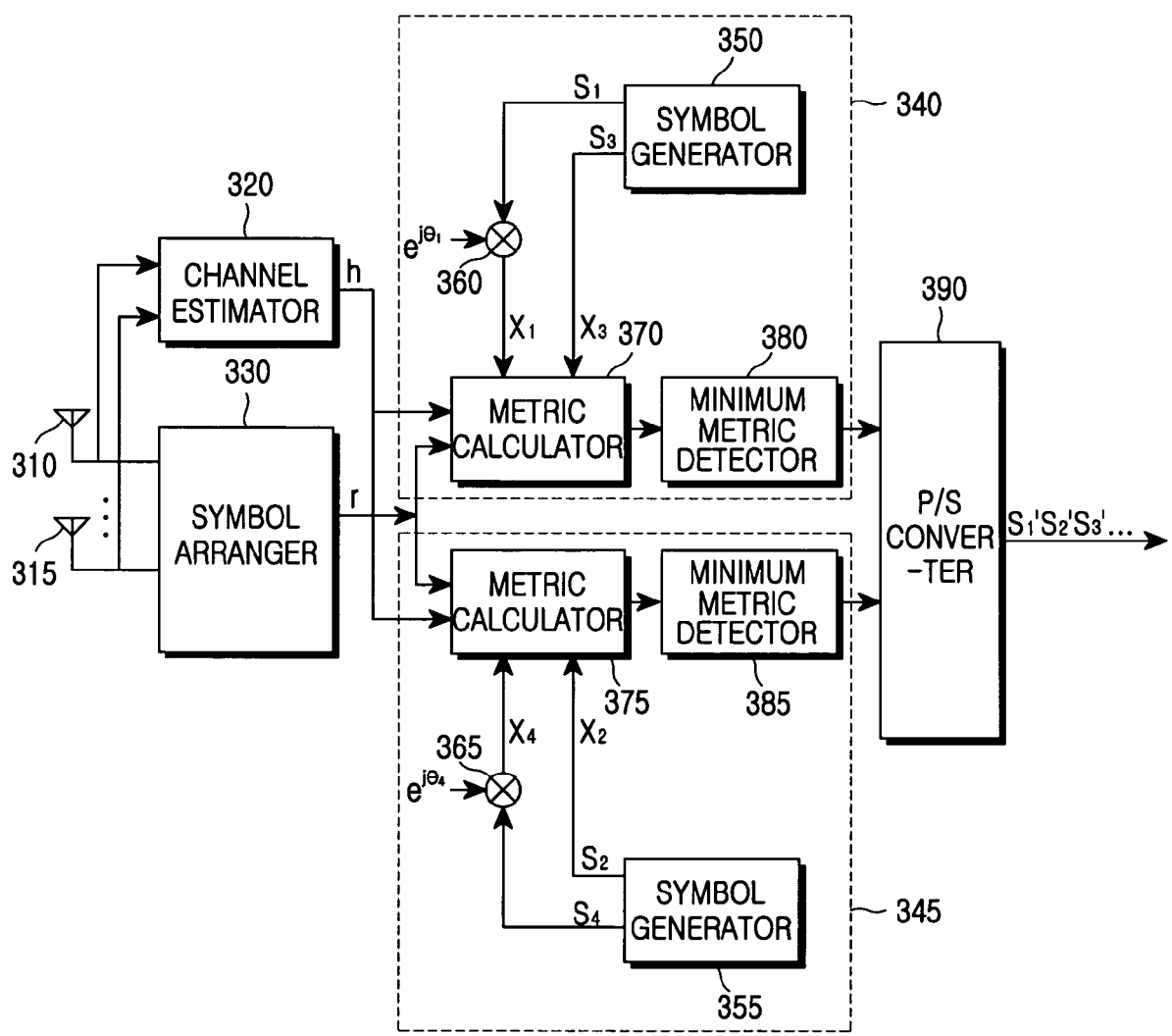
FIG. 4 is a block diagram illustrating a structure of a receiver for receiving a signal transmitted by the transmitter of FIG. 3.

FIG. 4 is a block diagram illustrating a structure of a receiver for receiving a signal transmitted by the transmitter of FIG. 3. The receiver according to a first embodiment of the present invention includes two ML decoders 340 and 345, which operate independently.

Referring to FIG. 4, a channel estimator 320 estimates channel coefficients, i.e., channel gains $h_1$, $h_2$ and $h_3$, from the 3 transmission antennas 240, 242 and 244 to reception antennas 310 and 315, and a symbol arranger 330 collects signals $r_1$, $r_2$, $r_3$ and $r_4$ received via each of the reception antennas 310 and 315 for 4 time intervals.

If the number of reception antennas is 1, the symbol arranger 330 collects signals $r_1$, $r_2$, $r_3$ and $r_4$ received for 4 time intervals. This is because the transmitter transmitted symbols of one block for 4 time intervals. When two or more reception antennas are used, the symbol arranger 330 forms a matrix by collecting received signals. In this case, the symbol arranger 330 arranges signals received via one reception antenna in one row, and arranges signals received via another reception antenna in another row. Although the receiver has herein multiple reception antennas 310 and 315, a description of the invention will be made with reference to a case where one reception antenna is used, for simplicity.

When it is desired to restore 4 symbols $s_1$, $s_2$, $s_3$ and $s_4$ transmitted from a transmitter, the first decoder 340 detects $s_1$ and $s_3$ according to the channel gains and the reception signals, and the second decoder 345 detects $s_2$ and $s_4$ in the same manner. In this way, the 4 symbols are simultaneously detected by the first and second decoders 340 and 345. The detected symbols are represented by s' in order to distinguish them from their original symbols.

An operation the first decoder 340 will now be described in a case where the encoding matrix of Equation (11) is used. In the first decoder 340, a symbol generator 350 generates all possible sub-combinations $s_1$ and $s_3$, and a phase rotator 360 phase-rotates one, $s_1$, of the generated symbols by the same phase value $\theta_1$ as that used by a transmitter, and outputs $e^{j\theta_1}s_1$. A metric calculator 370 determines metric values by calculating Equation (9) for all symbol sub-combinations including one phase-rotated symbol with the estimated channel gains $h_1$, $h_2$ and $h_3$ and the reception signals $r_1$, $r_2$, $r_3$ and $r_4$. A minimum metric detector 380 then detects $s_1'$ and $s_3'$ having minimum metric values among the metric values.

Such an operation is performed in the same manner in the second decoder 345. When the first decoder 340 detects $s_1'$ and $s_3'$ and the second decoder 345 detects $s_2'$ and $s_4'$ in this manner, a parallel-to-serial (P/S) converter 390 sequentially arranges the detected symbols and outputs a symbol combination of $s_1'$, $s_2'$, $s_3'$ and $s_4'$.

A phase value used to phase-rotate symbols in the transmitter and the receiver of FIGS. 3 and 4 must be determined according to a minimum coding gain of error matrixes. The "error matrix" is a matrix in which differences between symbols containing errors detected at a receiver and originally transmitted symbols are arranged, and the "minimum coding gain" means the product of all eigen values of an error matrix.

Figure 5:
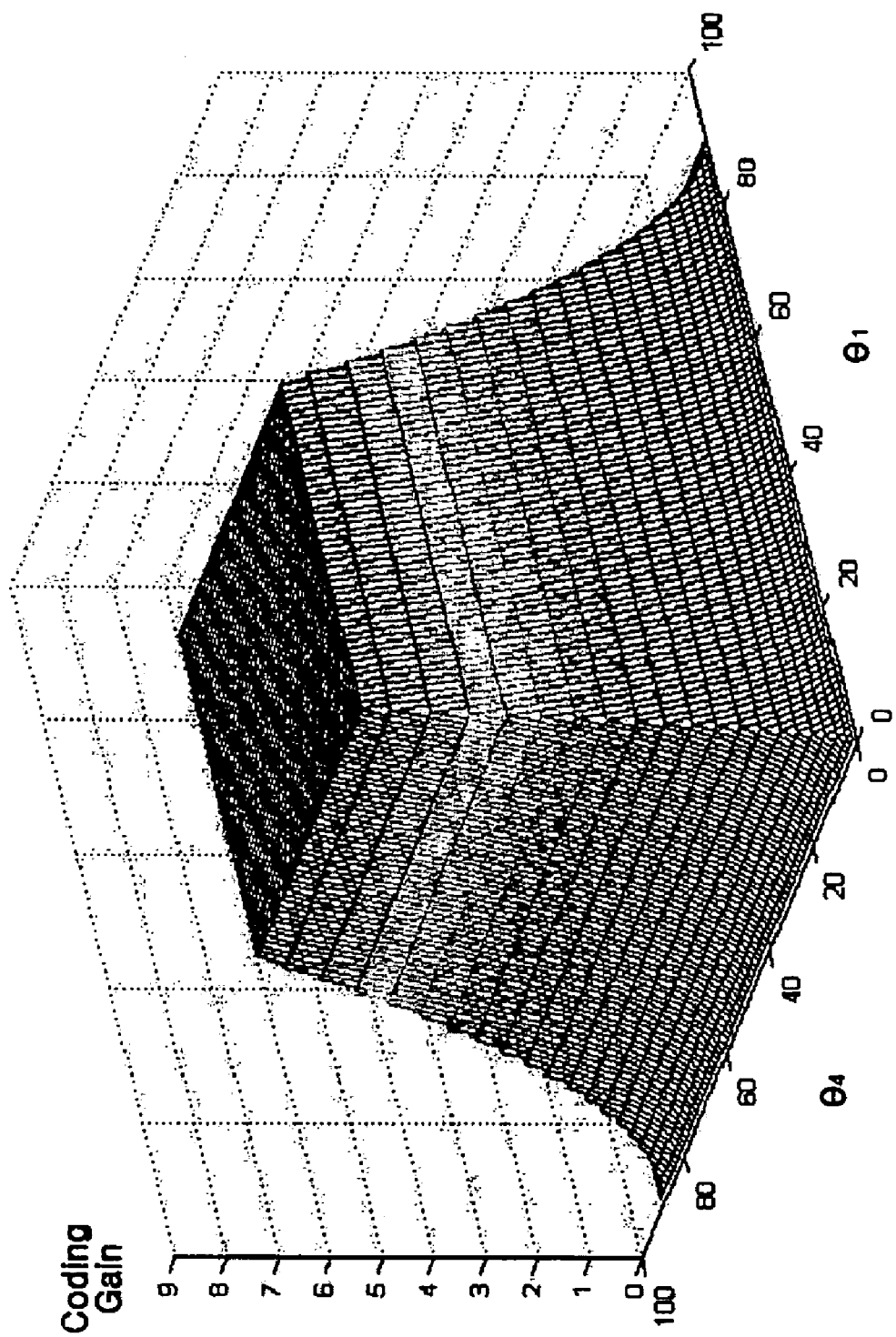
FIG. 5 illustrates a simulation result showing a variation in a minimum coding gain for 2 phase values when QPSK is used in the first embodiment of the present invention.

FIG. 5 illustrates a simulation result showing a variation in a minimum coding gain for 2 phase values when QPSK is used in the first embodiment of the present invention. In FIG. 5, an x-axis and a y-axis represent 2 phase values, respectively, and a z-axis represents a minimum coding gain of an error matrix. If a phase value becomes a multiple of 90°, a minimum coding gain becomes 0. This is because if a QPSK constellation is rotated by 90°, it becomes its original constellation.

Figure 6:
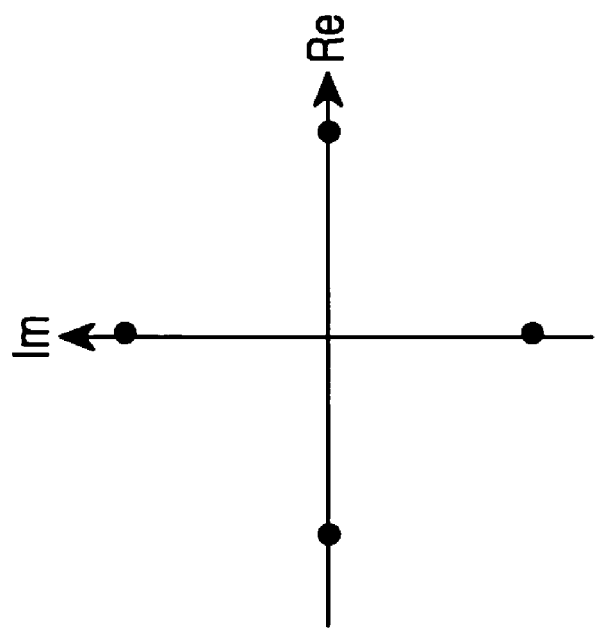
FIG. 6 illustrates a QPSK constellation which is phase-rotated by 45°.
Figure 6:
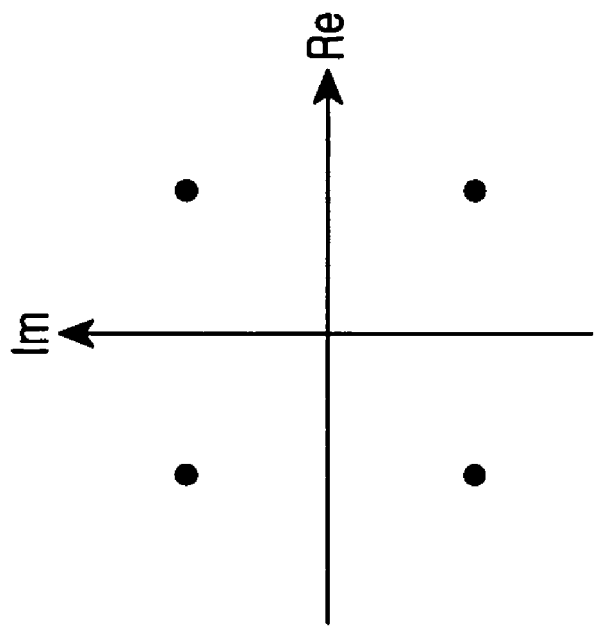

It can be understood from the result of FIG. 5 that when all phase values exist at around 45°, the minimum coding gain becomes flat. Therefore, a phase value preferable in the first embodiment of the invention is 45°. FIG. 6 illustrates a QPSK constellation which is phase-rotated by 45°. As illustrated, the phase-rotated symbols are situated on a real axis or an imaginary axis. According to the first embodiment of the invention, a preferable phase rotation range is between 21° and 69° centering on 45° for QPSK, between 21° and 24° for 8 PSK, and is 11.25° for 16 PSK. However, the invention is not restricted to the figures, and the preferable phase rotation range shall be set according to characteristics of the system.

Figure 7:
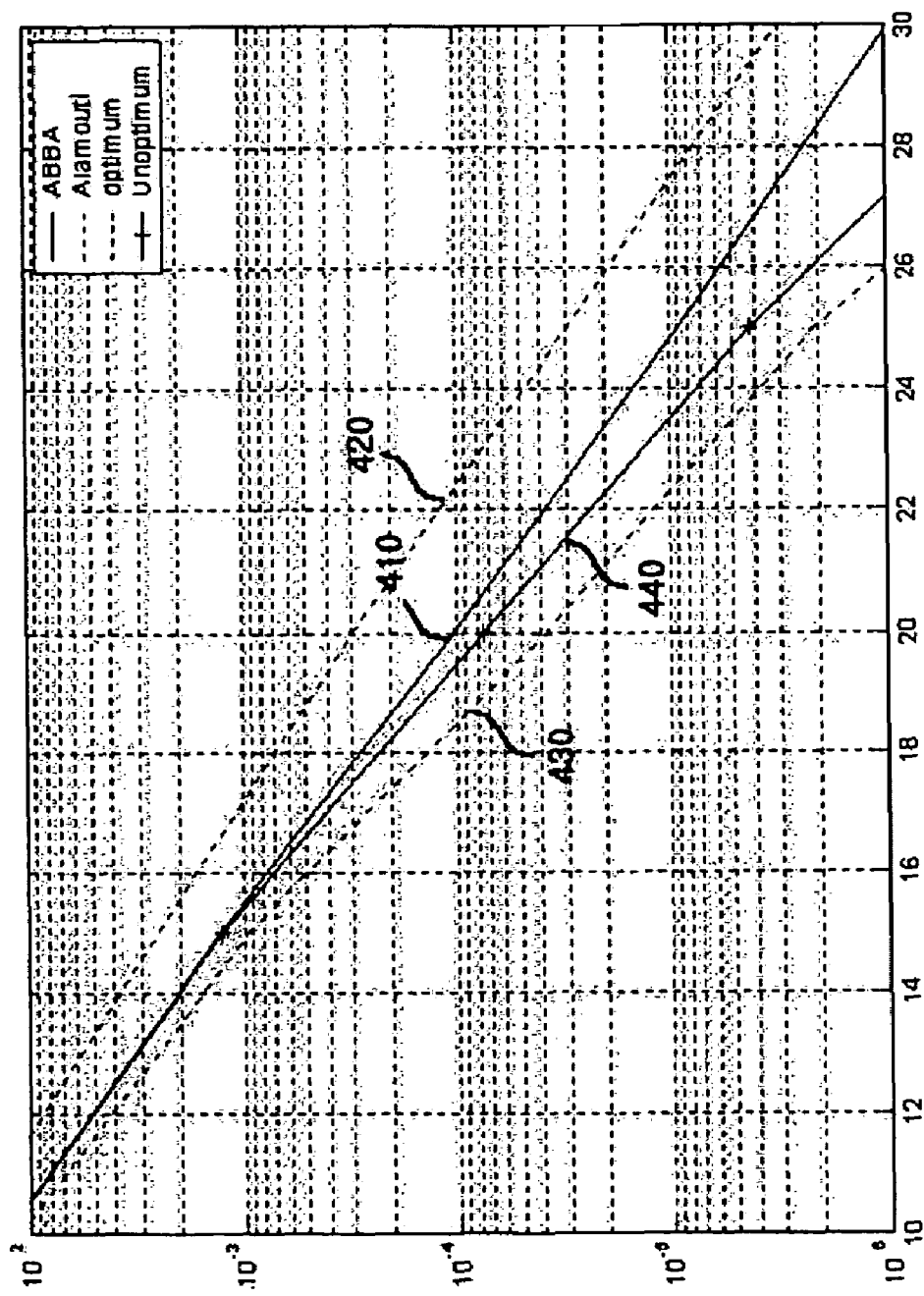
FIG. 7 is a graph illustrating a comparison between the block coding technique according to the first embodiment of the present invention and the conventional techniques in terms of a bit error rate (BER) for a signal-to-noise ratio (SNR)

FIG. 7 is a graph illustrating a comparison between the block coding technique according to the first embodiment of the present invention and the conventional techniques in terms of a bit error rate (BER) for a signal-to-noise ratio (SNR). In FIG. 7, a curve 410 shows efficiency in the case where an 8×3 encoding matrix with orthogonal rows proposed by Tarokh is used, a curve 420 shows efficiency in the case where 2 antennas are used as proposed by Alamouti, a curve 430 show efficiency in the case where a 4×3 encoding matrix having a phase value optimized according to the first embodiment is used, and a curve 440 shows efficiency in the case where a 4×3 encoding matrix having a non-optimized phase value is used. As illustrated, a block code having a phase value optimized according to the first embodiment has a lower BER in the same SNR environment.

Second Embodiment

In the second embodiment of the invention, 3 input symbols are transmitted via 3 antennas for 3 time intervals. Compared with the first embodiment, the second embodiment further decreases transmission latency.

As mentioned above, in order to secure a maximum diversity order, each symbol must appear only once in each time interval of each antenna, and a unique 3×3 encoding matrix satisfying such a condition is given by $$C_{33} = \begin{bmatrix} s_1 & s_2 & s_3 \\ s_3 & s_1 & s_2 \\ s_2 & s_3 & s_1 \end{bmatrix} \quad (12)$$

An error matrix of a space-time block code using the encoding matrix of Equation (12) can be expressed as $$D_{33} = C_{33} - E_{33} = \begin{bmatrix} d_1 & d_2 & d_3 \\ d_3 & d_1 & d_2 \\ d_2 & d_3 & d_1 \end{bmatrix} \quad (13)$$

where $C_{33}$ is a transmission encoding matrix, and $E_{33}$ is a matrix representing determined symbols containing errors. In Equation (13), a coding gain of $D_{33}$ is $3d_1d_2d_3-d_1^3-d_2^3-d_3^3$. Thus, if $d_1=d_2=d_3$ or $d_2=0$ and $d_1=-d_3$, then the coding gain becomes 0. In this case, a diversity order is lower than 3 which is the number of the transmission antennas, thus incurring a large loss in performance.

In the second embodiment of the invention, in order to prevent a coding gain from becoming 0, two symbols selected from three symbols are rotated by a predetermined phase value, and this can be expressed in an encoding matrix defined as $$\begin{pmatrix} e^{-j\theta_1}s_1 & e^{-j\theta_2}s_2 & s_3 \\ s_3 & e^{-j\theta_1}s_1 & e^{-j\theta_2}s_2 \\ e^{-j\theta_2}s_2 & s_3 & e^{-j\theta_1}s_1 \end{pmatrix} \quad (14)$$

Herein, $s_1$ and $s_2$ among 3 input symbols $s_1$, $s_2$ and $s_3$ are phase-rotated by $-\theta_1$ and $-\theta_2$, respectively Then, a coding gain of a space-time block code using the encoding matrix of Equation (14) always becomes 3.

If a metric value is calculated with channel gains $h_1$, $h_2$ and $h_3$ from 3 transmission antennas to a reception antenna for Equation (14), it becomes $$|r_1-h_1e^{-j\theta_1}s_1-h_2e^{-j\theta_2}s_2-h_3s_3|^2+|r_2-h_1s_3-h_2e^{-j\theta_1}s_1-h_3e^{-j\theta_2}s_2|^2+|r_3-h_1e^{-j\theta_2}s_2-h_2s_3-h_3e^{-j\theta_1}s_1|^2 \quad (15)$$

A receiver then determines symbols $s_1$ to $s_3$ that minimize Equation (15).

Figure 8:
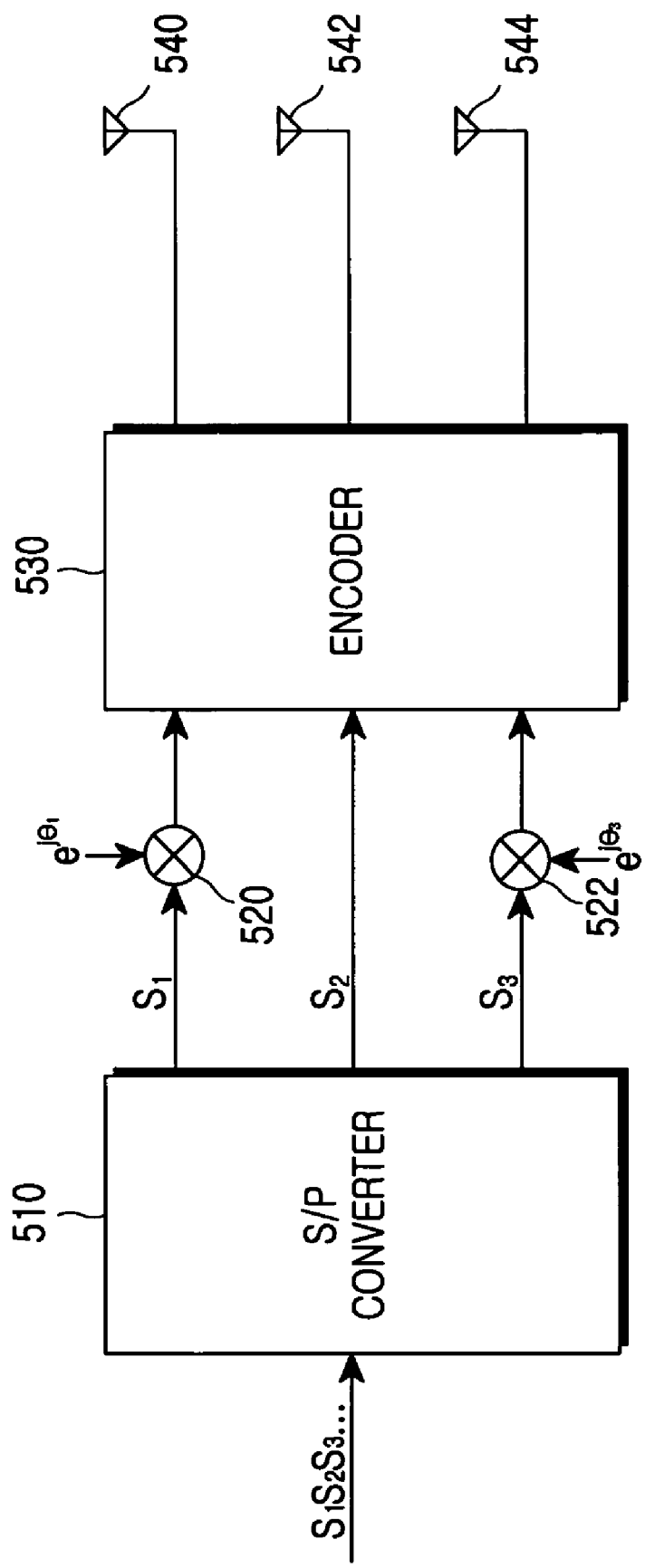
FIG. 8 is a block diagram illustrating a structure of a transmitter using a space-time block code according to a second embodiment of the present invention.

FIG. 8 is a block diagram illustrating a structure of a transmitter using a space-time block code according to a second embodiment of the present invention. As illustrated, the transmitter is comprised of an S/P converter 510, two phase rotators 520 and 522, an encoder 530, and three transmission antennas 540, 542 and 544.

FIG. 8 is a block diagram illustrating a structure of a transmitter using a space-time block code according to a second embodiment of the present invention. As isllustrated, the transmitter is comprised of an S/P converter 510, two phase rotators 520 and 522, an encoder 530, and three transmission antennas 540, 542 and 544.

In other words, the encoder 530 applies negative and conjugate to 3 input complex symbols, and outputs the result values for 3 time intervals. Herein, the encoder 530 sequentially delivers symbols in an $M^{th}$ row of an encoding matrix to an $M^{th}$ antenna. That is, the encoder 530 simultaneously delivers symbols in an $n^{th}$ column in an $n^{th}$ time interval.

For example, when $s_1$ and $s_3$ among 3 input symbols $s_1$, $s_2$ and $s_3$ are phase-rotated by $-\theta_1$ and $-\theta_2$, respectively, an output of the encoder 530 can be expressed in a 3×3 encoding matrix of Equation (14) above. When the encoding matrix of Equation (14) is used, 3 symbols $e^{-j\theta_1}s_1$, $e^{-j\theta_2}s_2$ and $s_3$ in a first row are delivered to the 3 antennas 540, 542 and 544, respectively, in a first time interval, and symbols $e^{-j\theta_2}s_2$, $s_3$, and $e^{-j\theta_1}s_1$ in the last $3^{rd}$ row are delivered to the 3 antennas 540, 542 and 544, respectively, in the last $3^{rd}$ time interval.

Figure 9:
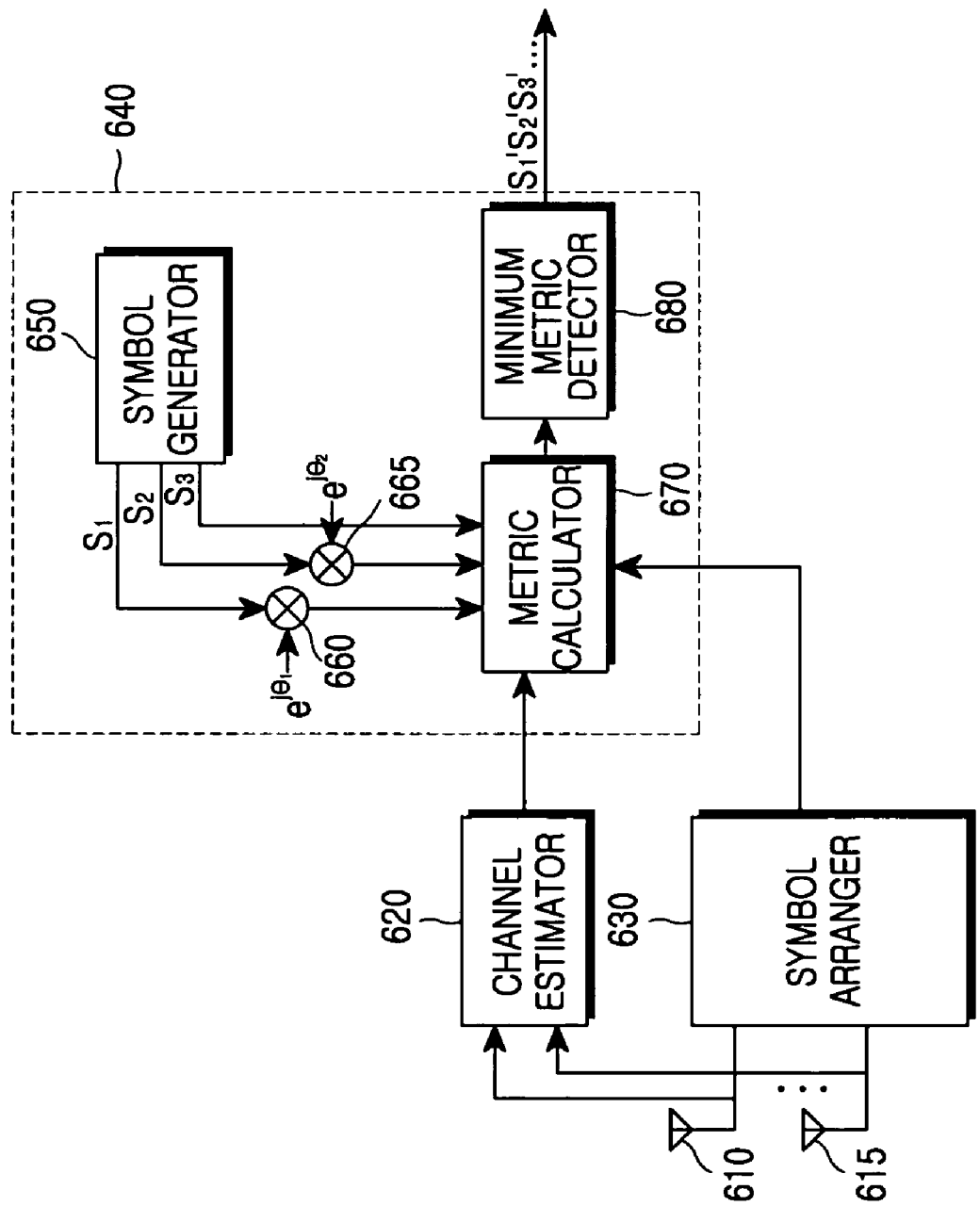
FIG. 9 is a block diagram illustrating a structure of a receiver for receiving a signal transmitted by the transmitter of FIG. 8.

FIG. 9 is a block diagram illustrating a structure of a receiver for receiving a signal transmitted by the transmitter of FIG. 8. Although the receiver has herein multiple reception antennas 610 and 615, a description of the invention will be made with reference to a case where one reception antenna is used, for simplicity.

Referring to FIG. 9, a channel estimator 620 estimates channel coefficients, i.e., channel gains, from the 3 transmission antennas 540, 542 and 544 to reception antennas 610 and 615, and a multi-channel symbol arranger 630 collects signals received via the reception antennas 610 and 615. If the number of reception antennas is 1, the symbol arranger 630 forms one block by collecting signals received for 3 time intervals. When two or more reception antennas are used, the symbol arranger 630 forms a matrix by collecting signals received via the reception antennas for 3 time intervals. In this case, the symbol arranger 630 arranges signals received via one reception antenna in one row, and arranges signals received via another reception antenna in another row.

An ML decoder 640 then restores 3 desired symbols every third time intervals with the channel gains from the channel estimator 620 and the reception signals from the symbol arranger 630. The ML decoder 640 is comprised of a symbol generator 650, phase rotators 660 and 665, a metric calculator 670, and a minimum metric detector 680.

An operation the ML decoder 640 will now be described in a case where the encoding matrix of Equation (14) is used. The symbol generator 650 generates all possible combinations $s_1$, $s_2$ and $s_3$, and outputs them one by one in each time interval, and the phase rotators 660 and 665 phase-rotate two symbols $s_1$ and $s_2$ selected from the symbols output from the symbol generator 650 by the same phase values $-\theta_1$ and $-\theta_2$ as those used by the transmitter, respectively, and output $e^{-j\theta_1}s_1$ and $e^{-j\theta_2}s_2$. A combination of $e^{-j\theta_1}s_1$ and $e^{-j\theta_2}s_2$ will be called a symbol combination.

The metric calculator 670 determines metric values for all symbol combinations by multiplying the channel gains $h_1$, $h_2$ and $h_3$ by all the possible symbol combinations generated by the symbol generator 650 according to a predetermined method and using reception signals $r_1$, $r_2$ and $r_3$ arranged by the symbol arrangers 660 and 665. An operation of the metric calculator 670 is performed in accordance with Equation (15). The minimum metric detector 680 then detects symbol combinations $s_1'$, $s_2'$ and $s_3'$ having minimum metric values among the metric values.

Figure 10:
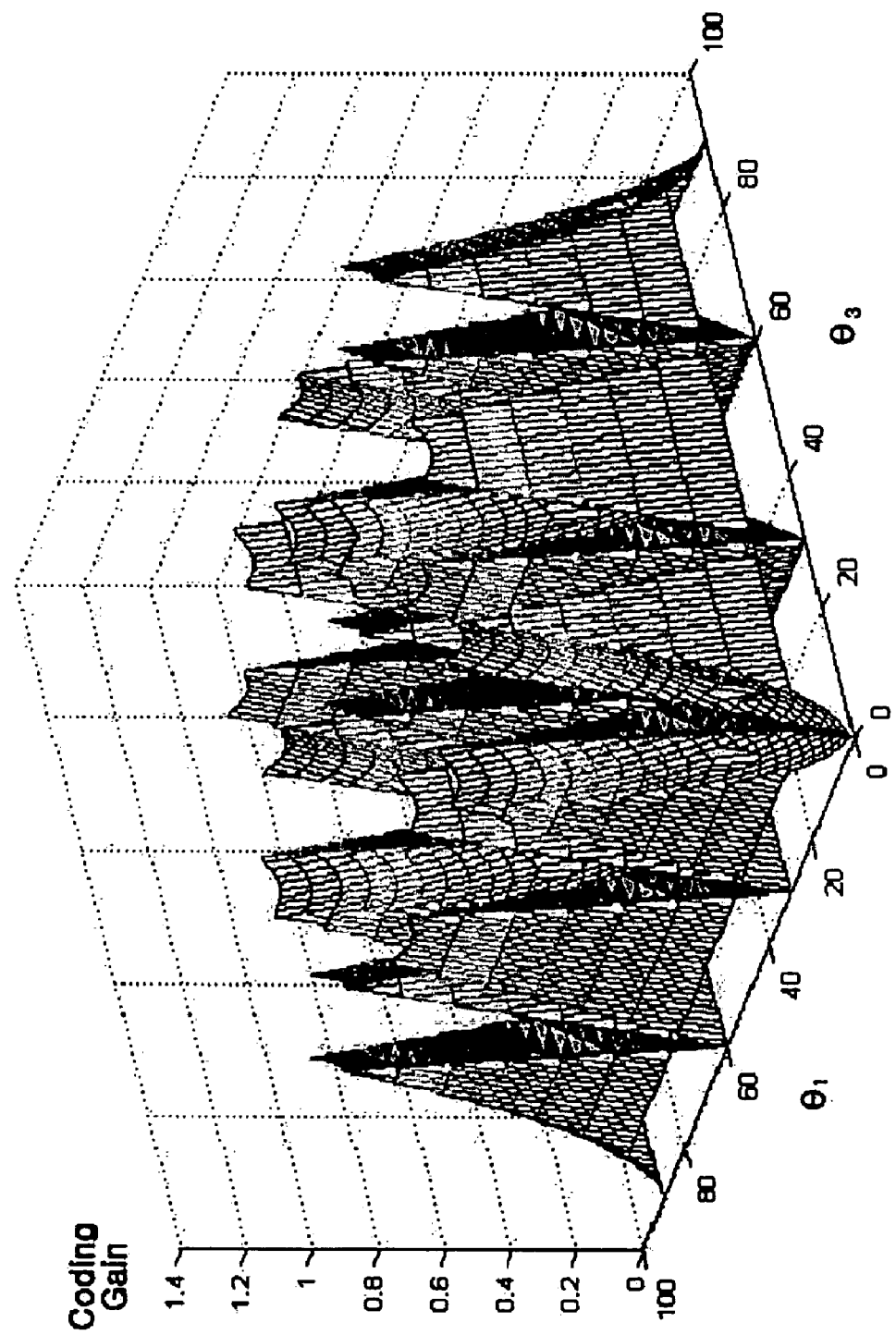
FIG. 10 illustrates a simulation result showing a variation in a minimum coding gain for 2 phase values when QPSK is used in the second embodiment of the present invention.

A coding gain of the encoding matrix shown in Equation (14) depends upon a phase value used in phase-rotating symbols. FIG. 10 illustrates a simulation result showing a variation in a minimum coding gain for 2 phase values when QPSK is used in the second embodiment of the present invention. In FIG. 10, an x-axis and a y-axis represent 2 phase values, respectively, and a z-axis represents a minimum coding gain of an error matrix. A minimum coding gain 0 means a loss of a diversity gain.

It can be understood from the result of FIG. 10 that when phase values are a multiple of 30°, the minimum coding gain becomes 0. Therefore, two phase values are determined so that the minimum coding gain is maximized. As a difference between the two phase values becomes greater, their performances are superior. Preferable phase values according to the second embodiment of the invention become a multiple of 30°, such as 30°, 60°, 90°, 120°, 150° and 180°.

Figure 11:
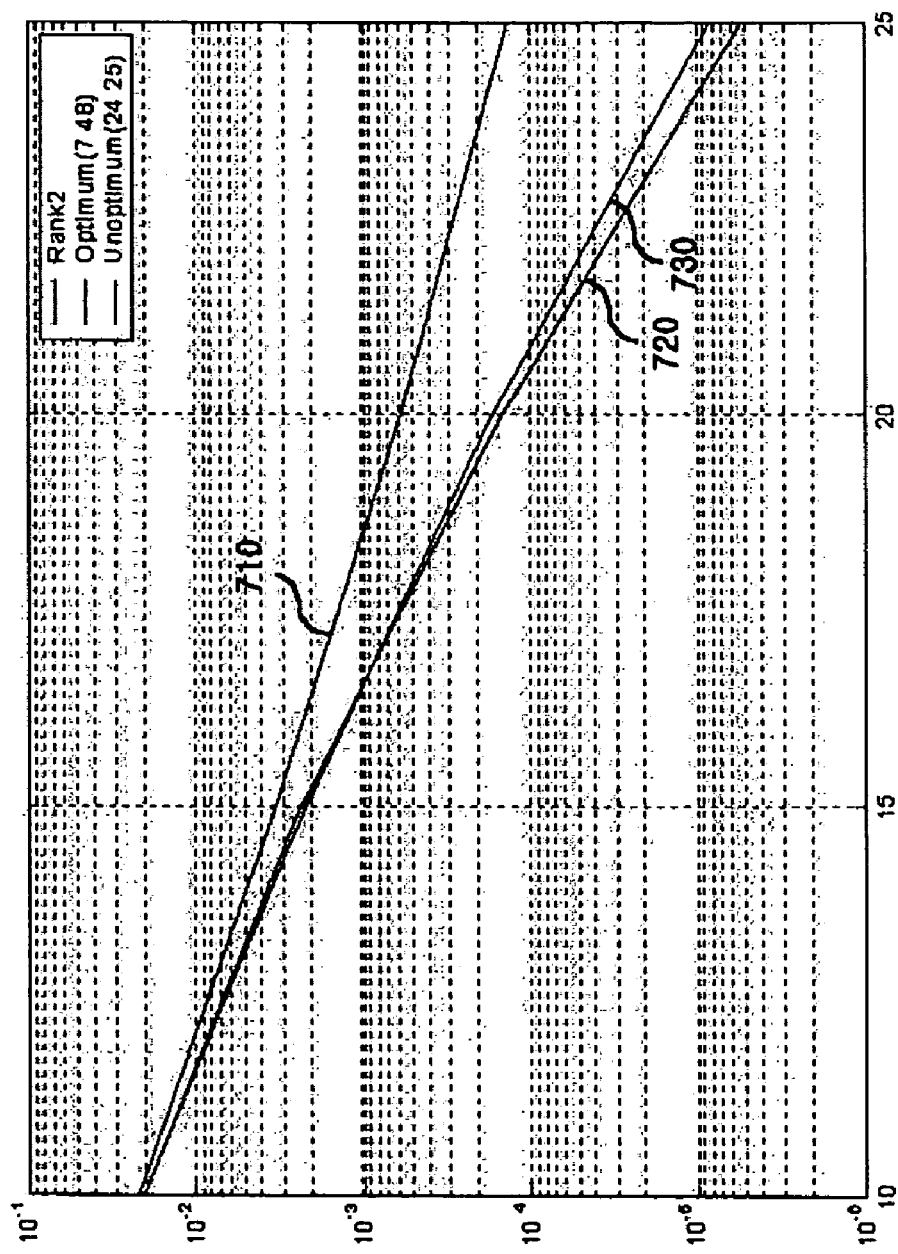
FIG. 11 is a graph illustrating a comparison between the block coding technique according to the second embodiment of the present invention and the conventional techniques in terms of a bit error rate (BER) for a signal-to-noise ratio (SNR).

FIG. 11 is a graph illustrating a comparison between the block coding technique according to the second embodiment of the present invention and the conventional techniques in terms of a bit error rate (BER) for a signal-to-noise ratio (SNR). In FIG. 11, a curve 710 shows efficiency in the case where a non-phase-rotated encoding matrix is used, a curve 720 shows efficiency in the case where a 3×3 encoding matrix having a phase value (7.48°) optimized according to the second embodiment is used, and a curve 730 show efficiency in the case where a 3×3 encoding matrix having a non-optimized phase value (24° and 25°) is used. As illustrated, a block code having a phase value optimized according to the second embodiment has a lower BER in the same SNR environment.

As described above, the invention can obtain a maximum diversity order without a loss of a rate, and is robust against fast fading by decreasing transmission latency. In particular, the first embodiment of the invention can simplify a decoding scheme by allowing some rows of an encoding matrix to become orthogonal with each other, and the second embodiment of the invention can further reduce transmission latency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmitter for transmitting complex symbols in a wireless communication system, comprising:

three transmission antennas; and an encoder ensuring maximum diversity by grouping N input symbols into N combinations each including three symbols by applying negative and conjugate to the symbols so that the N input symbols are transmitted only once from each antenna and at each time interval, and delivering the N combinations to the three transmission antennas for N time intervals;

wherein at least two symbols selected from the N input symbols are phase-rotated by predetermined phase values.

2. The transmitter of claim 1, wherein N is 4.

3. The transmitter of claim 2, wherein for quadrature phase shift keying (QPSK), the phase values range from 21° to 69°, centering on 45°.

4. The transmitter of claim 2, wherein for 8-ary phase shift keying (8PSK), the phase values range from 21° to 24°.

5. The transmitter of claim 2, wherein for 16-ary phase shift keying (16PSK), the phase values are 11.25°.

6. The transmitter of claim 2, wherein the encoder produces four combinations by applying negative and conjugate to four symbols so that two symbol sequences among three symbol sequences delivered to each antenna for four time intervals are orthogonal with each other.

7. The transmitter of claim 6, wherein the four combinations are each comprised of the four input symbols and constitute matrixes each having four rows and three columns, as follows $$\begin{bmatrix} x_1 & x_2 & -x_3^* \\ -x_2^* & x_1^* & x_4 \\ x_3 & x_4 & x_1^* \\ -x_4^* & x_3^* & -x_2 \end{bmatrix} \begin{bmatrix} x_1 & x_2 & -x_3^* \\ -x_2^* & x_1^* & -x_4 \\ x_3 & x_4 & x_1^* \\ -x_4^* & x_3^* & x_2 \end{bmatrix} \begin{bmatrix} x_1 & x_2 & x_3^* \\ -x_2^* & x_1^* & x_4 \\ x_3 & x_4 & -x_1^* \\ -x_4^* & x_3^* & -x_2 \end{bmatrix} \begin{bmatrix} x_1 & x_2 & x_3^* \\ -x_2^* & x_1^* & -x_4 \\ x_3 & x_4 & -x_1^* \\ -x_4^* & x_3^* & x_2 \end{bmatrix}$$

$$\begin{bmatrix} x_1 & x_2 & -x_3^* \\ -x_2^* & x_1^* & x_4 \\ x_3 & x_4 & x_1^* \\ x_4^* & -x_3^* & x_2 \end{bmatrix} \begin{bmatrix} x_1 & x_2 & x_3^* \\ -x_2^* & x_1^* & x_4 \\ x_3 & x_4 & -x_1^* \\ x_4^* & -x_3^* & x_2 \end{bmatrix} \begin{bmatrix} x_1 & x_2 & -x_3^* \\ x_2^* & -x_1^* & x_4 \\ x_3 & x_4 & x_1^* \\ -x_4^* & x_3^* & x_2 \end{bmatrix} \begin{bmatrix} x_1 & x_2 & x_3^* \\ x_2^* & -x_1^* & x_4 \\ x_3 & x_4 & -x_1^* \\ -x_4^* & x_3^* & x_2 \end{bmatrix}$$

$$\begin{bmatrix} x_1 & x_2 & -x_3^* \\ x_2^* & -x_1^* & -x_4 \\ x_3 & x_4 & x_1^* \\ -x_4^* & x_3^* & x_2 \end{bmatrix} \begin{bmatrix} x_1 & x_2 & -x_3^* \\ x_2^* & -x_1^* & x_4 \\ x_3 & x_4 & x_1^* \\ -x_4^* & x_3^* & -x_2 \end{bmatrix} \begin{bmatrix} x_1 & x_2 & x_3^* \\ x_2^* & -x_1^* & -x_4 \\ x_3 & x_4 & -x_1^* \\ -x_4^* & x_3^* & x_2 \end{bmatrix} \begin{bmatrix} x_1 & x_2 & x_3^* \\ x_2^* & -x_1^* & x_4 \\ x_3 & x_4 & -x_1^* \\ -x_4^* & x_3^* & -x_2 \end{bmatrix}$$

where $x_1$, $x_2$, $x_3$ and $x_4$ are four input symbols including two phase-rotated symbols.

8. The transmitter of claim 1, wherein N is 3.

9. The transmitter of claim 8, wherein three combinations are each comprised of three input symbols and constitute a matrix having three rows and three columns, as follows $$\begin{bmatrix} e^{-j\theta_1}s_1 & e^{-j\theta_2}s_2 & s_3 \\ s_3 & e^{-j\theta_1}s_1 & e^{-j\theta_2}s_2 \\ e^{-j\theta_2}s_2 & s_3 & e^{-j\theta_1}s_1 \end{bmatrix}$$

where $s_1$, $s_2$ and $s_3$ are the three input symbols, and $\theta_1$ and $\theta_2$ are phase values of $s_1$ and $s_2$, respectively.

10. The transmitter of claim 8, wherein the phase values are a multiple of 30°, and are determined so that a difference between the phase values becomes maximized.

11. A receiver for receiving complex symbols in a wireless communication system, comprising:

a symbol arranger for receiving signals received via at least one reception antenna from three transmission antennas, for four time intervals, the symbol arranger forming a matrix by collecting the signals received via the at least one reception antenna, where signals received via one reception antenna are arranged in one row, and signals received via another reception antenna are arranged in another row;

a channel estimator for receiving signals via the at least one reception antenna, and estimating three channel gains representing channel gains from the three transmission antennas to the at least one reception antenna;

first and second decoders for calculating metric values for all possible sub-combinations each including two symbols by using the channel gains received from the channel estimator and the signals received by the symbol arranger, and detecting two symbols having a minimum metric value; and a parallel-to-serial converter for sequentially arranging two symbols detected by the first and second decoders.

12. The receiver of claim 11, wherein the first and second decoders each comprise:

a symbol generator for generating all possible sub-combinations each including two symbols;

a phase rotator for phase-rotating one symbol selected from the two symbols by a predetermined phase value;

a metric calculator for calculating a metric value for symbol sub-combinations including the phase-rotated symbol with the signals received by the symbol arranger and the channel gains; and a detector for detecting two symbols having a minimum metric value by using the calculated metric values.

13. The receiver of claim 12, wherein the first decoder detects two symbols for minimizing a metric value calculated by $|R_1-e^{j\theta_1}s_1|^2+|R_3-s_3|^2+2(C_3)\mathrm{Re}\{e^{-j\theta_1}s_1{}^*s_3\}$ where $s_1$ and $s_3$ are two symbols to be detected, $\theta_1$ is a phase value of $s_1$, $R_1=r_1h_1{}^*+r_2{}^*h_2+r_3{}^*h_3$, $R_3=r_2{}^*h_3+r_4h_1{}^*-r_3{}^*h_2$, $C_3=h_3{}^*h_2-h_3h_2{}^*$, $h_1$, $h_2$ and $h_3$ are channel gains estimated for three transmission antennas, and $r_1$, $r_2$, $r_3$ and $r_4$ are signals received for four time intervals.

14. The receiver of claim 12, wherein the second decoder detects two symbols for minimizing a metric value calculated by $|R_2-e^{j\theta_4}s_2|^2+|R_4-s_4|^2+2(C_4)\mathrm{Re}\{e^{-j\theta_2}s_2{}^*s_4\}$ where $s_2$ and $s_4$ are two symbols to be detected, $\theta_2$ is a phase value of $s_2$, $R_2=r_1h_2{}^*-r_2{}^*h_1+r\,r_4h_3{}^*$, $R_4=r_1h_3{}^*-r_3{}^*h_1-r_4h_2{}^*$, $C_4=h_3h_2{}^*-h_3{}^*h_2$, $h_1$, $h_2$ and $h_3$ are channel gains estimated for three transmission antennas, and $r_1$, $r_2$, $r_3$ and $r_4$ are signals received for four time intervals.

15. A receiver for receiving complex symbols in a wireless communication system, comprising:

a symbol arranger for receiving signals received via at least one reception antenna from three transmission antennas, for three time intervals, the symbol arranger forming a matrix by collecting the signals received via the at least one reception antenna, where signals received via one reception antenna are arranged in one row, and signals received via another reception antenna are arranged in another row;

a channel estimator for receiving signals via the at least one reception antenna, and estimating three channel gains representing channel gains from the three transmission antennas to the at least one reception antenna; and a decoder for calculating metric values for all possible symbol combinations each including three symbols by using the channel gains received from the channel estimator and the signals received by the symbol arranger, and detecting three symbols having a minimum metric value comprising:

a symbol generator for generating all possible symbol combinations each including three symbols:

two phase rotators for phase-rotating two symbols selected from the three symbols by predetermined phase values ($\theta_1$, $\theta_2$);

a metric calculator for calculating metric values for symbol combinations including the phase-rotated symbols with the signals received by the symbol arranger and the channel gains; and a detector for detecting three symbols having a minimum metric value by using the calculated metric value.

16. The receiver of claim 15, wherein the decoder detects three symbols for minimizing a metric value calculated by $$|r_1 - h_1 e^{-j\theta_1} s_1 - h_2 e^{-j\theta_2} s_2 - h_3 s_3|^2 + |r_2 - h_1 s_3 - h_2 e^{-j\theta_1} s_1 - h_3 e^{-j\theta_2} s_2|^2 + |r_3 - h_1 e^{-j\theta_1} s_2 - h_2 s_3 - h_3 e^{-j\theta_1} s_1|^2$$

$$|r_1 - h_1 e^{-j\theta_2} s_2 - h_3 s_3|^2 + |r_2 - h_1 s_3 - h_2 e^{-j\theta_1} s_1 - h_3 e^{-j\theta_2} s_2|^2 + |r_3 - h_1 e^{-j\theta_2} s_2 - h_2 s_3 - h_3 e^{-j\theta_1} s_1|^2$$

where $s_1$, $s_2$ and $s_3$ are three symbols constituting a symbol combination, $\theta_1$ and $\theta_2$ are phase values of $s_1$ and $s_2$, respectively, $h_1$, $h_2$ and $h_3$ are channel gains for three transmission antennas, and $r_1$, $r_2$ and $r_3$ are signals received for three time intervals.

17. A transmitter for transmitting complex symbols in a wireless communication system, comprising:

M transmission antennas; and an encoder ensuring maximum diversity by grouping N input symbols into N combinations each including M symbols by applying negative and conjugate to the symbols so that the N input symbols are transmitted only once from each antenna and at each time interval, and delivering the N combinations to the M transmission antennas for N time intervals;

wherein at least two symbols selected from the N input symbols are phase-rotated by predetermined phase values.

18. The transmitter according to claim 8, wherein the encoder produces three combinations by applying negative and conjugate to three symbols ($s_1$, $s_2$, $s_3$) so that two symbol sequences among three symbol sequences delivered to each antenna for three time intervals are orthogonal with each other.

* * * * *